(12) United States Patent
Jackson

(10) Patent No.: US 11,333,498 B2
(45) Date of Patent: May 17, 2022

(54) MAGNETIC COMPASS COMPENSATION

(71) Applicant: ION Geophysical Corporation, Houston, TX (US)

(72) Inventor: Adam P. Jackson, New Orleans, LA (US)

(73) Assignee: ION Geophysical Corporation, Houston, TX (US)

( * ) Notice: Subject to any disclaimer, the term of this patent is extended or adjusted under 35 U.S.C. 154(b) by 203 days.

(21) Appl. No.: 16/740,429

(22) Filed: Jan. 11, 2020

(65) Prior Publication Data

US 2020/0225035 A1 Jul. 16, 2020

Related U.S. Application Data

(60) Provisional application No. 62/791,403, filed on Jan. 11, 2019.

(51) Int. Cl.
*G01C 17/38* (2006.01)
*G01C 17/28* (2006.01)
*G01S 19/01* (2010.01)

(52) U.S. Cl.
CPC ............ *G01C 17/38* (2013.01); *G01C 17/28* (2013.01); *G01S 19/01* (2013.01)

(58) Field of Classification Search
CPC .......... G01C 17/38; G01C 17/28; G01S 19/01
See application file for complete search history.

(56) References Cited

U.S. PATENT DOCUMENTS

| | | | | |
|---|---|---|---|---|
| 4,124,897 A | * | 11/1978 | Martin | G01C 17/28 33/356 |
| 7,826,999 B1 | * | 11/2010 | Boeen | G01C 25/005 702/141 |
| 2016/0075443 A1 | * | 3/2016 | Schmutz | G08G 5/0056 701/14 |

FOREIGN PATENT DOCUMENTS

| | | | | |
|---|---|---|---|---|
| WO | WO-03074969 A2 | * | 9/2003 | ............ G01C 17/38 |
| WO | 0393762 A1 | | 11/2003 | |
| WO | WO-2011063510 A1 | * | 6/2011 | ............... G01V 3/17 |

OTHER PUBLICATIONS

PCT International Preliminary Report on Patentability for Application No. PCT/US2020/013254 dated Jun. 16, 2021.

(Continued)

*Primary Examiner* — Mischita L Henson
(74) *Attorney, Agent, or Firm* — Patterson + Sheridan, LLP

(57) ABSTRACT

A method for compensating a magnetic heading includes one or more of obtaining a magnetic heading from a magnetic instrument deployed with an apparatus, determining location data for the apparatus, determining local field data based on the location data, obtaining a magnetic profile for the magnetic instrument deployed with the apparatus, and compensating the magnetic heading based the magnetic profile. For example, the magnetic profile may be responsive to perturbation of the local geomagnetic field by the apparatus, so that the compensated heading is more responsive to a directional heading of the apparatus, when deployed in the geomagnetic field. An apparatus for performing the method is also described, along with another method for calibrating the magnetic instrument when deployed with the apparatus, in order to generate the magnetic profile.

25 Claims, 12 Drawing Sheets

(56) References Cited

OTHER PUBLICATIONS

PCT Notification of Transmittal of the International Search Report and the Written Opinion of the International Searching Authority, or the Declaration for Application No. PCT/US2020/013254 dated Jun. 25, 2020.
PCT Invitation to Pay Additional Fees and Where Applicable, Protest Fee for Application No. PCT/US2020/013254 dated Apr. 23, 2020.

* cited by examiner

MAGNETIC COMPASS COMPENSATION

CROSS-REFERENCE TO RELATED APPLICATION

This application claims priority to U.S. Provisional Application No. 62/791,403, MAGNETIC COMPASS COMPENSATION METHOD, filed Jan. 11, 2019, which is incorporated by reference herein, in the entirety and for all purposes.

BACKGROUND

This disclosure relates to magnetic navigation, magnetic compasses, and magnetic bearing systems. More generally, the disclosure relates to magnetic bearing and compass compensation, including, but not limited to, magnetic compass compensation for marine or land-based navigational systems.

Magnetic compass systems can be corrected for a range of different operational conditions, including geomagnetic field variations and the local magnetic conditions of the vessel or apparatus in which the compass operates. Compass compensation can also be used to address real-time response issues including unsteady readings and sluggishness.

Magnetic deviation is commonly described in terms of deflection of the magnetic needle, card, or other indicator from the magnetic meridian; e.g., to the left or right with respect to the horizontal component of the local magnetic field lines, as defined along the surface of the earth or water body. Traditionally, marine compasses are adjusted by arranging a combination of magnetic and soft iron correctors about the binnacle or compass housing, so their effects are equal and opposite to those of the magnetic material in the surrounding vessel or other magnetic structure, reducing the deviation and improving response in sluggish or unsteady sectors.

Magnetic conditions affecting compass operation include both permanent and induced magnetism. Vertical components may tend to tilt the compass card, and can create oscillating deflections in response to rolling, pitching and other motions of the vessel. Roll effects, for example, may tend to increase on north and south compass headings, and pitch effects may increase on east and west compass headings. Horizontal components, in turn, can cause varying deviations as the ship swings in heading on an even keel. More generally, these deviations also depend on the local magnetic field strength (or magnitude) and direction, which can vary from location to location.

SUMMARY

This disclosure relates to compasses and other magnetic instruments, and compensating measurements made by such instruments. Depending on embodiment, suitable compensation methods include one or more of receiving a heading measurement request, receiving or obtaining a raw heading from a magnetic instrument, retrieving geographic location data, determining local magnetic field data based on the geographic location data, and adjusting a stored magnetic profile for the device, based on the local magnetic field data. The raw heading can be compensated based on the adjusted magnetic profile, in order to provide a compensated magnetic heading for the instrument.

DETAILED DESCRIPTION

In offshore subsea measurement and exploration fields, the use of inertial navigation systems (INS) for subsea device (SD) positioning is well established. An ever-present challenge to INS integrators, users, and developers is the need to have an accurate estimate of the SD's heading at the INS initialization time. Various magnetic sensing technologies may be used to perform measurements to acquire an initial heading "fix", such as flux gate, anisotropic magnetoresistance (AMR), magneto-inductive (MI), optical encoder, etc.

However, one challenge in acquiring an accurate "fix" is the magnetic signature of the SD. That is, materials, components, and design of the SD may result in a magnetic signature that affects accuracy of magnetic instruments at initialization. Typically, due to the size, the materials needed for deep ocean work and underwater power required, magnetic instrument recalibration is needed to maintain instrument accuracy specifications. As a result, the recalibration of magnetic instruments of the SD may be needed at the start of any work deployment. Depending on the SD size and environmental conditions present, on-site calibration of magnetic instruments may be quite a time consuming and arduous task for the end user or operator.

This disclosure provides a method to calibrate of magnetic instruments in a SD in a controlled environment at a specific location. This disclosure also provides re-calibration methods that include conversion of the magnetic instrument calibration at the specific location to calibration applicable to other geographic (or geographical) locations; e.g., on or near the surface of the earth, above the surface, or in a submerged or underground location. The SD re-calibration may be applied at any geographic location in the world, without timely and costly in-theatre device re-calibration.

At a deployment, in response to receipt of the geographic location of the deployment, the described method may convert the initial calibration information at a specific location to calibration information applicable to the received geographic location. Accordingly, the present invention seeks to provide a location dependent calibration for SDs without requiring magnetic recalibration at deployment. The described method may allow for near instant on-heading performance, eliminate risks to the SD and the SD personnel, and saving time and costs as compared with conventional calibration methods at deployment.

Figure 1:
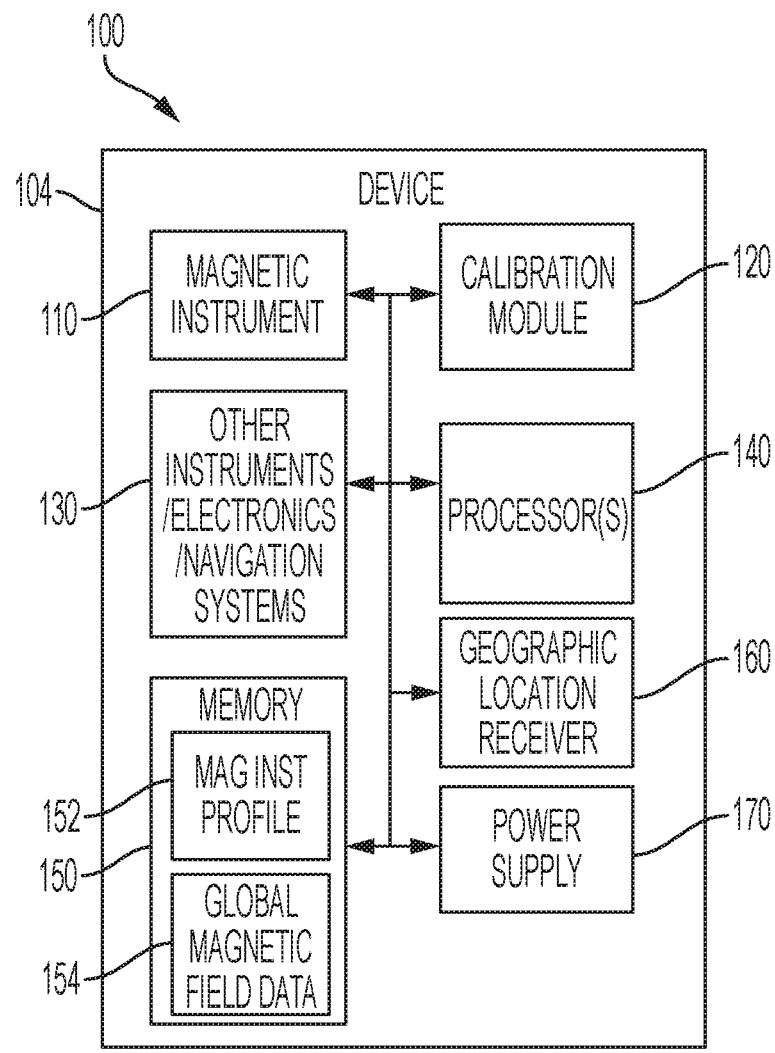
FIG. 1 is a block diagram of a subsea system in accordance with exemplary embodiments of the present disclosure.

FIG. 1 is a block diagram of a subsea system 100 in accordance with embodiments of the present disclosure. The system 100 may include a device or apparatus 104. The apparatus 104 may include a compass or other magnetic instrument 110, an instrument calibration module 120. Apparatus 104 may also include other instruments and electronics, for example a navigation system 130, one or more processor units 140, memory 150, a geographic location receiver 160, and a power supply 170.

The magnetic instrument or device 110 may include a magnetic compass in some embodiments. In other embodiments, the magnetic instrument 110 may include a magnetometer or other device adapted to measure the geomagnetic field in a particular location, or other local magnetic field.

The instrument calibration module 120 may include hardware and/or software that is used to convert a magnetic response profile (or error profile) associated with the magnetic instrument 110 based on magnetic information for a specific geographic location. The specific geographic location may be based on geographic location data provided by the geographic location receiver 160. The geographic location receiver 160 may include a global positioning system (GPS) receiver, in some examples, and the geographic location data may include GPS coordinates.

The instrument calibration module 120 may use a magnetic instrument profile 152 from the memory 150 to determine an initial calibration associated with the magnetic instrument 110, and then convert the initial calibration based on the magnetic instrument profile 152 to a calibration associated with a current geographic location based on data from the global magnetic field data 154 of the memory 150 and based on the current geographic location.

In some examples, the instrument calibration module 120 may include instructions stored at the memory 150 that are executed by the one or more processor units 140 to perform the re-calibration method. In other examples, the instrument calibration module may include an application-specific integrated circuit (ASIC), a field-programmable gate array (FPGA) configured to perform the re-calibration method, and/or some other circuit design configured to perform the re-calibration method. The calibrated heading information from the instrument calibration module 120 may be provided to one or more of the other instruments, electronics and/or navigation systems 130 during initialization and operation.

In operation, the device or apparatus 104 may be used in a subsea environment, in some examples. The apparatus 104 may include various navigation instruments within the other instruments, electronics and/or navigation systems 130, such as an INS.

Typically, an INS needs initial heading information to orient itself prior to starting tracking of navigational movement. Because a small heading error may lead to a large positional deviation during an operation, especially for long distance and/or duration operations, having an accurate magnetic heading from the magnetic instrument 110 at initialization may be important for operational success. An accurate magnetic heading from the magnetic instrument 110 may include compensating a raw magnetic heading reading for magnetic field differences between different geographic locations, as well as the magnetic profile of instrument 110 when mounted or disposed on a particular device or apparatus 104.

Figure 4A:
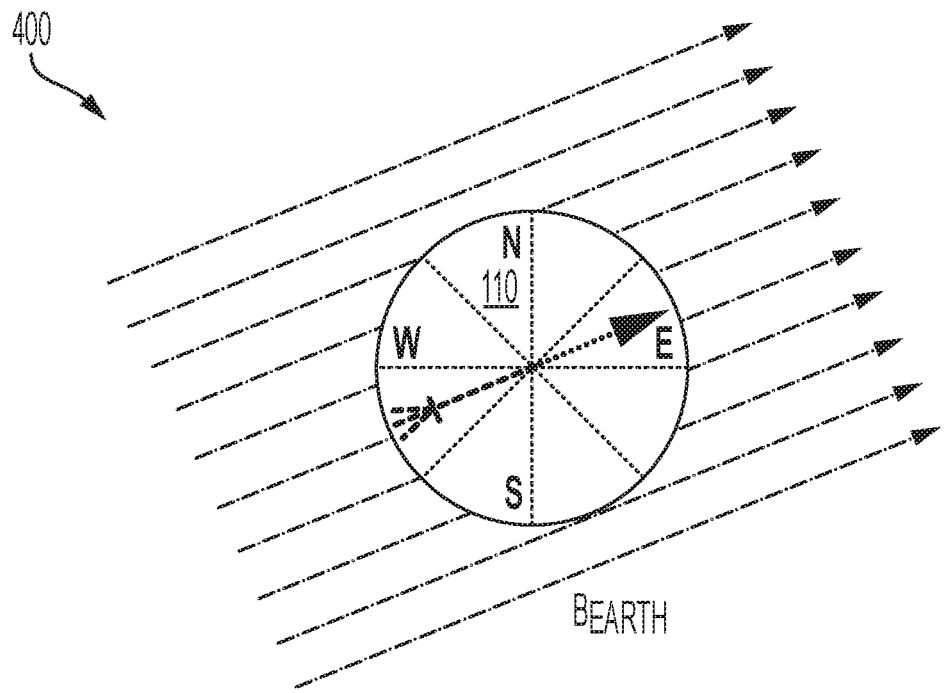
FIG. 4A is a graphic illustration of a nominal or "clean" magnetic field measured by a magnetic instrument, in a particular geographic location.
Figure 4B:
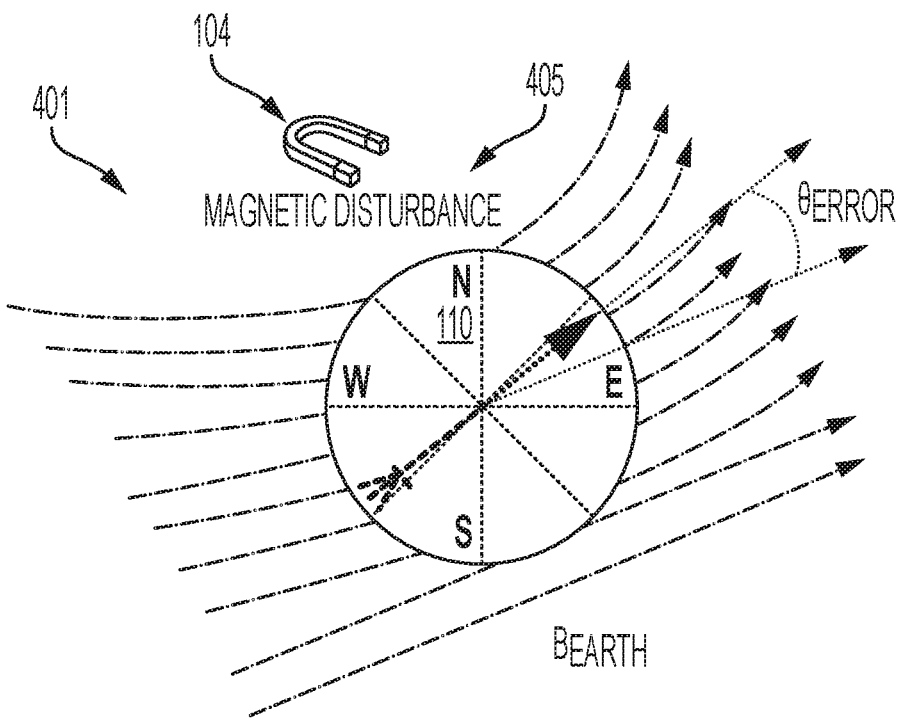
FIG. 4B is a graphic illustration of a measured magnetic field for the geographic location, including a magnetic perturbation or disturbance from the magnetic components of a device or apparatus according to FIG. 1.

FIG. 4A is a graphic illustration of an exemplary nominal (or "clean") magnetic field 400; e.g. the geomagnetic field surrounding a magnetic instrument 110 in a particular geographic location. FIG. 4B is a graphic illustration of an observed or measured magnetic field 401 that includes a magnetic perturbation or disturbance 405 on the nominal field 400, for example due to the magnetic components of a device or apparatus 104 in accordance with FIG. 1. The magnetic instrument 110 may be calibrated to compensate for the differences between the fields via a calibration procedure performed upon deployment of the apparatus at the geographic location, or in a newly selected geographic location.

The calibration procedure often involves a complex, time consuming, difficult procedure that includes performing a series of maneuvers in a specific order for a specific amount of time. In a marine environment, this can be challenging, as maneuvering a vessel in water is more difficult and less precise than movement on land. In a subsea application, these maneuvers become even more challenging and time consuming. One miss-step during the calibration procedure may result in starting the calibration procedure over again.

The magnetic response of the magnetic instrument 110 can be affected by the magnetic components of the apparatus 104, as well as the surrounding environment. Therefore, the apparatus 104 may include a magnetic instrument calibration module 120 according to FIG. 1; e.g., which is adapted to perform a calibration method according to FIG. 2 and configured to perform a compensation procedure according to FIG. 3. The calibration and compensation procedures are used to adjust the known magnetic profile of the magnetic instrument 110, when mounted on or disposed within the apparatus 104 at the current geographic location, and to compensate the observed magnetic heading based on the adjusted magnetic profile.

Figure 5A:
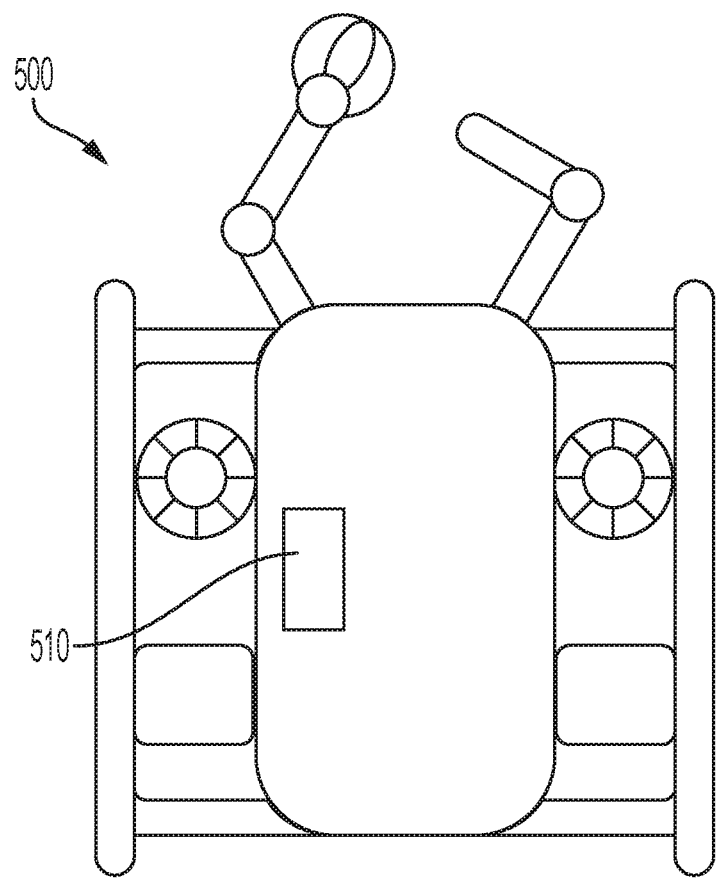
FIG. 5A is a schematic view of an apparatus with a magnetic instrument in accordance with various exemplary embodiments of the disclosure.
Figure 5B:
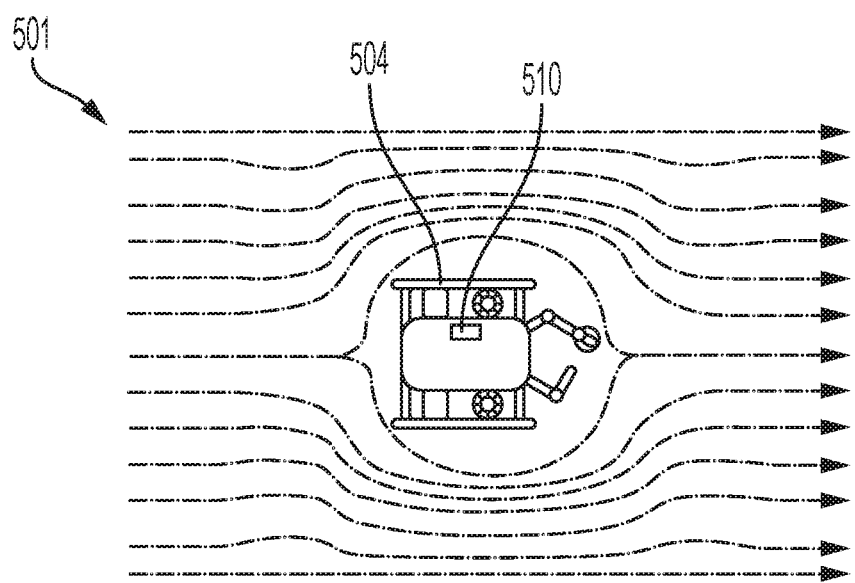
FIG. 5B is a plan view of the apparatus, disposed in a magnetic field at a selected geographic location.

FIG. 5A is a schematic view of an apparatus 504 with a magnetic instrument 510; e.g., in accordance with FIG. 1 or other exemplary embodiments of the disclosure. FIG. 5B is a plan view of the apparatus 504, disposed in a magnetic field 501 at a selected geographic location.

FIGS. 5A and 5B provide cross-sectional illustrations of an example device 504 with a compass or other magnetic instrument 510 in a particular location in accordance with some embodiments of the disclosure. The device 504 may include batteries and gyroscopes and other components that perturb the geomagnetic field, producing an observed field 501 that is detected and measured by the magnetic instrument 510. These components may contribute to the magnetic response of the device 504. In addition, the response of the magnetic instrument 510 to the nominal magnetic field at a particular geographic location may vary due to orientation of the apparatus 104, and based on differences between the magnetic fields at different geographic locations.

Figure 6:
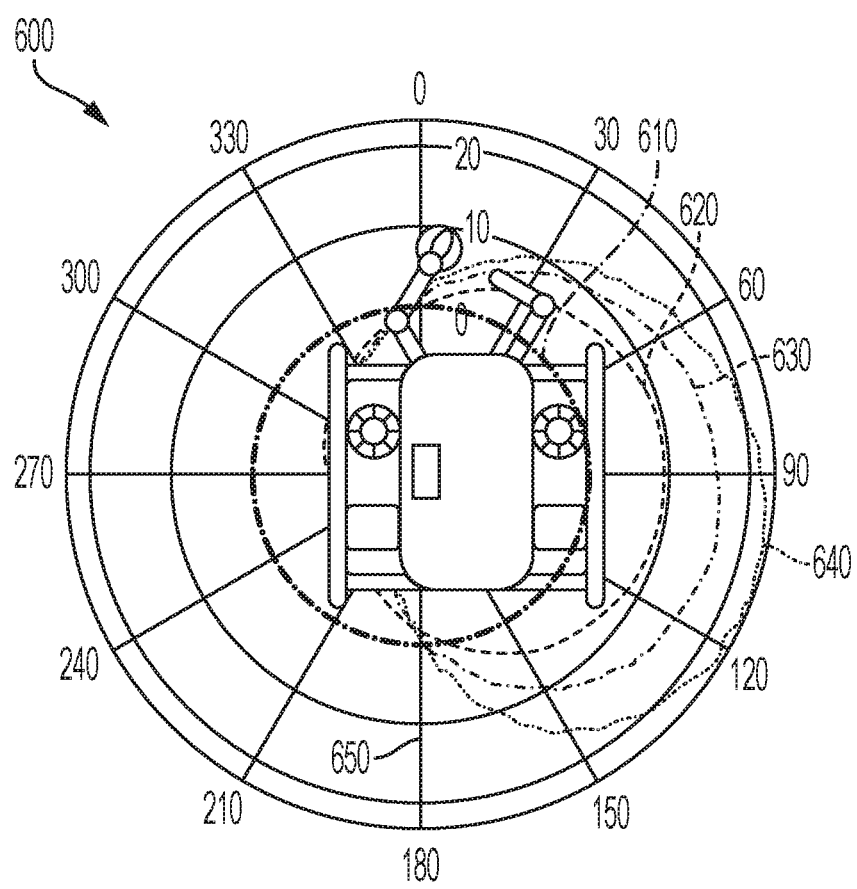
FIG. 6 is an illustration of representative magnetic compass heading errors at various geographic locations, in accordance with exemplary embodiments of the disclosure.

FIG. 6 is an illustration 600 of representative magnetic compass heading errors at various geographic locations, in accordance with exemplary embodiments of the disclosure. For example, the line 610 represents 0 degrees of compass error. The line 620 represents example compass error of Location 1. The line 630 represents example compass error in a mid-north latitude region. The line 640 represents example compass error in a high north latitude region.

The line 650 represents a representative "sweet spot" where the magnetic distortion or perturbation due to the magnetic components of the apparatus 104 substantially cancel out in equilibrium, so that the magnetic instrument 110 observes approximately the same magnetic heading at different geographic locations with different magnetic field strengths (or magnitudes). Thus, because the magnetic response of the instrument 110 depends on the magnetic components of the apparatus 104, and the interactions of those components with the magnetic fields in a particular location also vary based on orientation of the apparatus 104, heading accuracy may be affected without performing a new calibration when the apparatus 104 is deployed in a new location, in a selected orientation.

Figure 2:
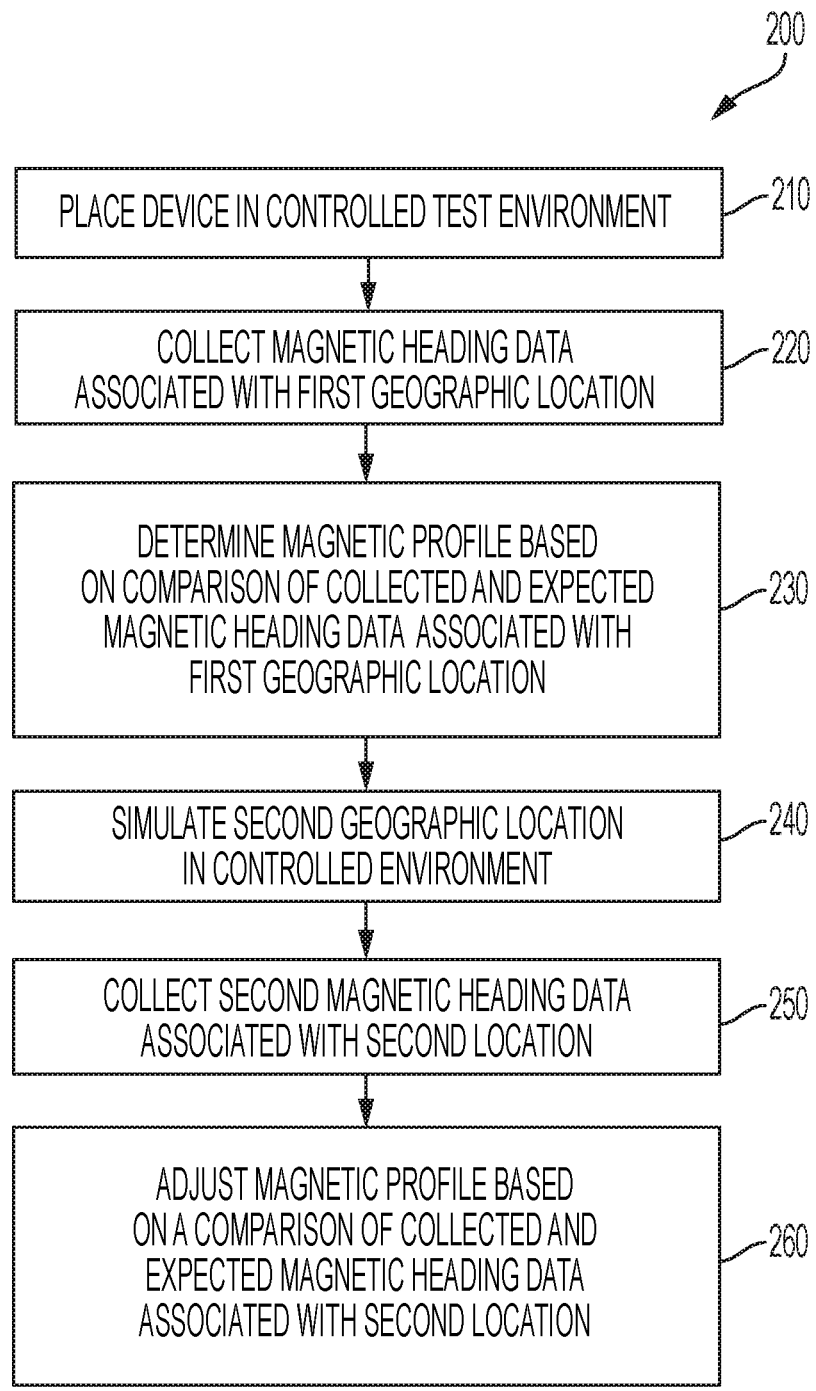
FIG. 2 is a flow chart illustrating a method to determine a magnetic profile for a magnetic instrument, in accordance with exemplary embodiments of the disclosure.

The magnetic profile can be determined as a difference profile or error profile using a method that includes calibrating the magnetic instrument 110 for a specific location, in order to determine the magnetic response. For example, FIG. 2 is a flow chart of a method 200 to determine the magnetic profile of a magnetic instrument in accordance with embodiments of the present disclosure. The method 200 can be performed on a selected magnetic heading device, such as the magnetic instrument 110 on apparatus 104 of FIG. 1, where the magnetic profile is based on the response of the magnetic instrument 110 to local magnetic (e.g., geomagnetic) fields, as perturbed by the apparatus 104.

The response of the combined magnetic instrument 110 and apparatus 104 can be determined in terms of a raw magnetic heading or raw magnetic reading obtained by the instrument 110, when operated on the apparatus 104 deployed in a particular location. The raw heading is not necessarily the same as a heading based on the nominal (unperturbed) local field, due to the presence of magnetic materials and other components in apparatus 104, and due to the surrounding structure and environment, which can alter the local magnetic field strength and direction. The method 200 provides for compensating the raw magnetic heading obtained by instrument 110 for these differences or errors, according to the measured magnetic response of the device when deployed on apparatus 104.

The magnetic profile can be measured in the same configuration in which the apparatus 104 is operationally deployed; that is, with the magnetic instrument 110 in the same location with respect to the apparatus 104. The magnetic profile can then be adjusted according to the local field strength and direction in a particular geographic location, in order to compensate the raw magnetic heading to provide a more accurate reading.

The method 200 may include placing a device in a controlled test environment, at 210. The controlled environment may be a test setup that can be configured to simulate magnetic fields for various geographic locations.

In some examples, the test setup may include a Helmholtz coil. The setup of the controlled environment may be based on known X, Y, Z coordinate directional components of the local magnetic field for a specific location.

Figure 7:
FIG. 7 is a table that has X, Y, Z coordinate directional components of the magnetic field for selected geographic locations on the Earth, in accordance with exemplary embodiments of the disclosure.

FIG. 7 is a table that has X, Y, Z coordinate directional components of the magnetic field for selected geographic locations on the Earth, in accordance with exemplary embodiments of the disclosure. For example, FIG. 7 includes a table 700 that has X, Y, Z coordinate directional components of the magnetic field for a few geographic locations (e.g., Locations 1-5) around on or near the surface of the Earth, in accordance with various embodiments of the disclosure.

The method 200 may further include collecting magnetic heading data associated with a first geographic location, at 220. That is, the test setup may be configured to simulate magnetic fields of a specific location, and then magnetic heading data may be collected based on the simulation. The magnetic heading data may be affected by magnetic fields of the specific location, as well as the error profile (e.g., magnetic signature) of the device.

The magnetic profile (or error profile) is responsive to magnetic field effects from electronic devices and circuits, power supplies, and materials from which the apparatus is constructed, including the apparatus housing. Collection of magnetic heading data can include collection of heading data from various orientations of the apparatus relative to the magnetic field at a specific geographic location (e.g., data take with a range of different vertical and horizontal rotations), and can include spinning or rotating the apparatus in clockwise or counter-clockwise directions, or both. The method 200 may further include determining a magnetic difference or error profile based on a comparison of the collected magnetic heading data to the expected or nominal magnetic heading at the first geographic location (step 230).

The method 200 can include adjusting the magnetic profile by repeating the tests at different simulated geographic locations. There may be some headings where the raw heading from the magnetic instrument 110, based on the perturbed field, converges on the actual or nominal heading based on the unperturbed (nominal) field.

Figure 8A:
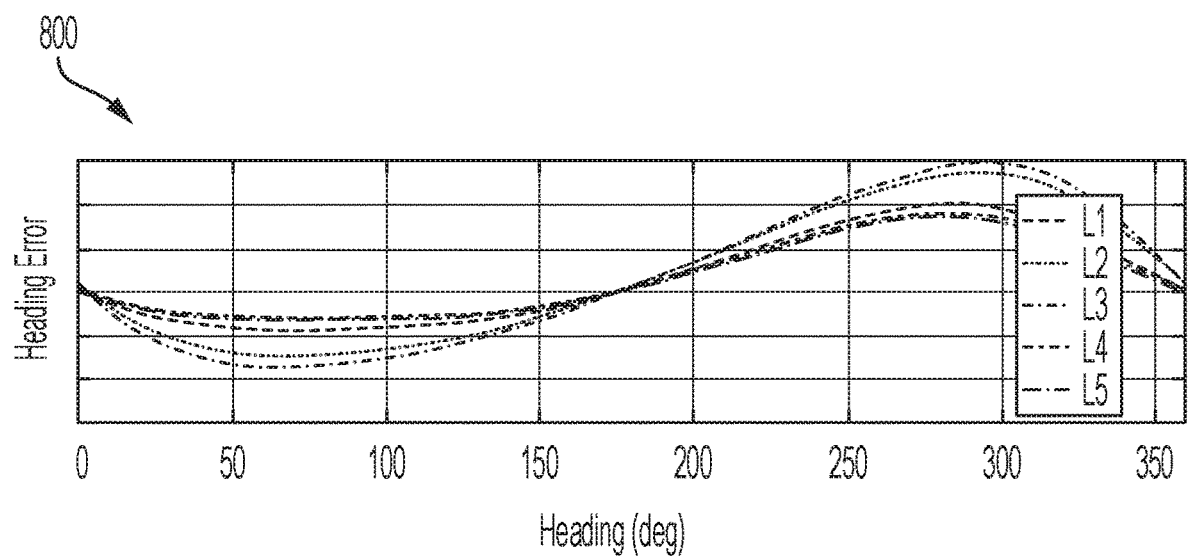
FIG. 8A is a representative uncorrected heading graph for a magnetic instrument, in accordance with exemplary embodiments of the disclosure.
Figure 8B:
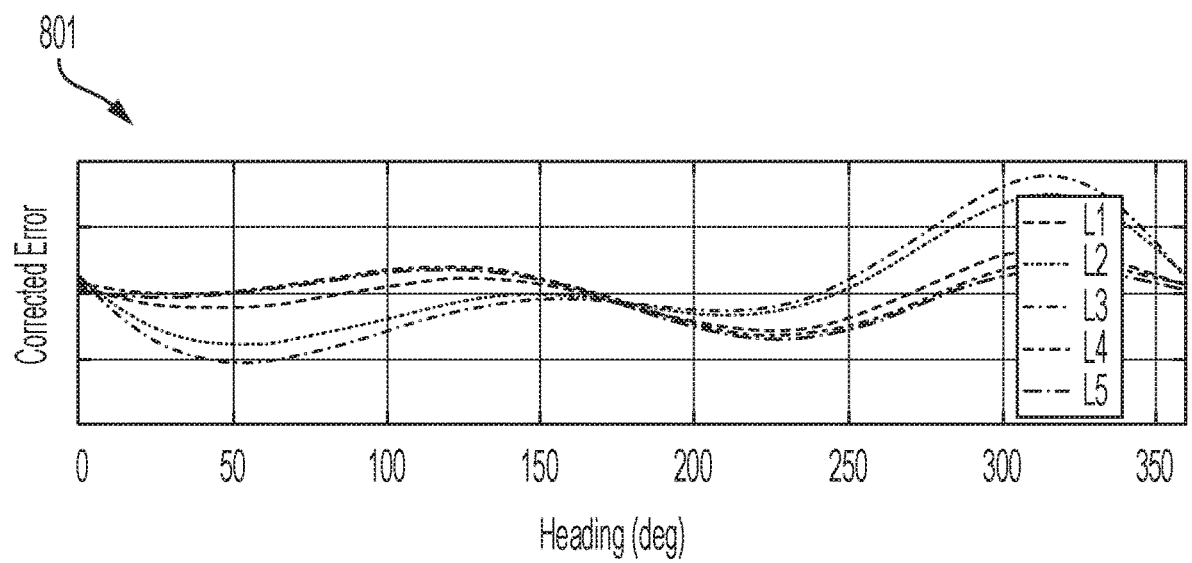
FIG. 8B is a representative corrected heading graph for the magnetic instrument, in accordance with exemplary embodiments of the disclosure.

FIG. 8A is a representative uncorrected heading graph 800 for a magnetic instrument, in accordance with exemplary embodiments of the disclosure. FIG. 8B is a representative corrected heading graph 801 for the magnetic instrument, in accordance with exemplary embodiments of the disclosure.

For example, FIG. 8A includes an exemplary uncorrected (raw) heading graph 800 and FIG. 8B includes an exemplary corrected (compensated) heading graph 801. In the uncorrected heading graph 800, the raw heading errors (differences between nominal and observed headings) for the selected geographic locations 1-5 tend to converge between 150 and 200 degrees, for example between about 170 and 180 degrees.

In the corrected (compensated) heading graph 801, heading errors in the various geographic Locations 1-5 also tend to converge between 170 and 180 degrees. However, the response of the magnetic profile to the magnetic fields in one geographic location as compared with another may be scaled based on the relative strength or magnitude of the magnetic fields at the different geographic locations, reducing the absolute error in some embodiments.

Figure 9A:
FIG. 9A is a table of representative horizontal and vertical geomagnetic field components and geomagnetic field ratios, for selected geographic locations.
Figure 9B:
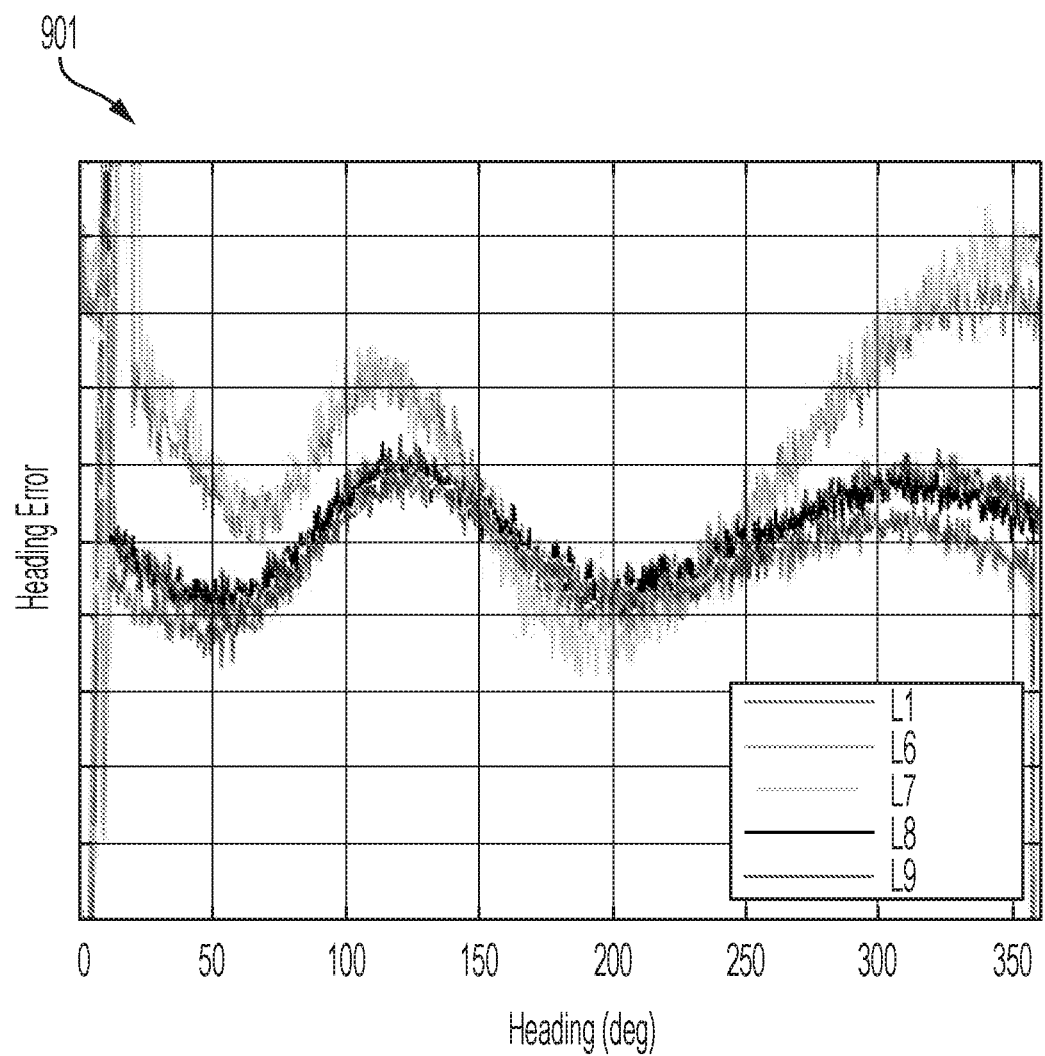
FIG. 9B is a graph showing representative heading differences or errors based on the geomagnetic field ratios of FIG. 9A, in accordance with exemplary embodiments of the disclosure.

FIG. 9A is a table of representative horizontal and vertical geomagnetic field components and geomagnetic field ratios, for selected geographic locations. FIG. 9B is a graph showing representative heading differences or errors based on the field ratios of FIG. 9A, in accordance with exemplary embodiments of the disclosure.

For example, FIG. 9A includes an exemplary table 900 and FIG. 9B includes a graph 901 that show horizontal magnetic field ratios as compared with Location 1, and the relative error differences at various locations (e.g., Locations 1 and 6-9) based on these ratio differences in accordance with some embodiments of the disclosure. Therefore, other locations (e.g., Locations 6-9) may be simulated to test accuracy at this specific location (e.g., Location 1).

In some examples, the method 200 may further include simulating a second geographic location in the controlled environment, at 240. The second geographic location may be different than the first geographic location.

In some examples, the method 200 may further include collecting second magnetic heading data associated with the second geographic location, at 250. The correction data may be based on the observed magnetic field data of the Earth at the second geographic location. In some examples, the method 200 may further include adjusting the magnetic error profile based on a comparison of the collected second magnetic heading data and an expected magnetic heading data at the second geographic location, at 260.

In some examples, the method 200 may further include further adjusting the magnetic error profile by simulating additional geographic locations. The accuracy of the magnetic error profile may be checked by collecting additional magnetic heading data at various geographic locations and using the magnetic error profile to compensate the collected magnetic heading data to provide compensated magnetic heading data.

Applications

As shown in FIG. 1, once the magnetic error profile for the specific location is determined, it may be stored at the memory 150 as the magnetic instrument error profile 152. The magnetic instrument error profile 152 may be accessible to the instrument calibration module 120 during a compensation at deployment. During a deployment, the instrument calibration module 120 may receive a raw magnetic measurement from the magnetic instrument 110, and may use the magnetic instrument error profile 152, the global magnetic field data 154, and current geographic location from the geographic location receiver 160 to convert the magnetic instrument error profile 152 to a magnetic error profile associated with the current location, and apply that magnetic error profile to the raw measurement to convert the raw magnetic measurement to a compensated magnetic measurement.

Figure 3:
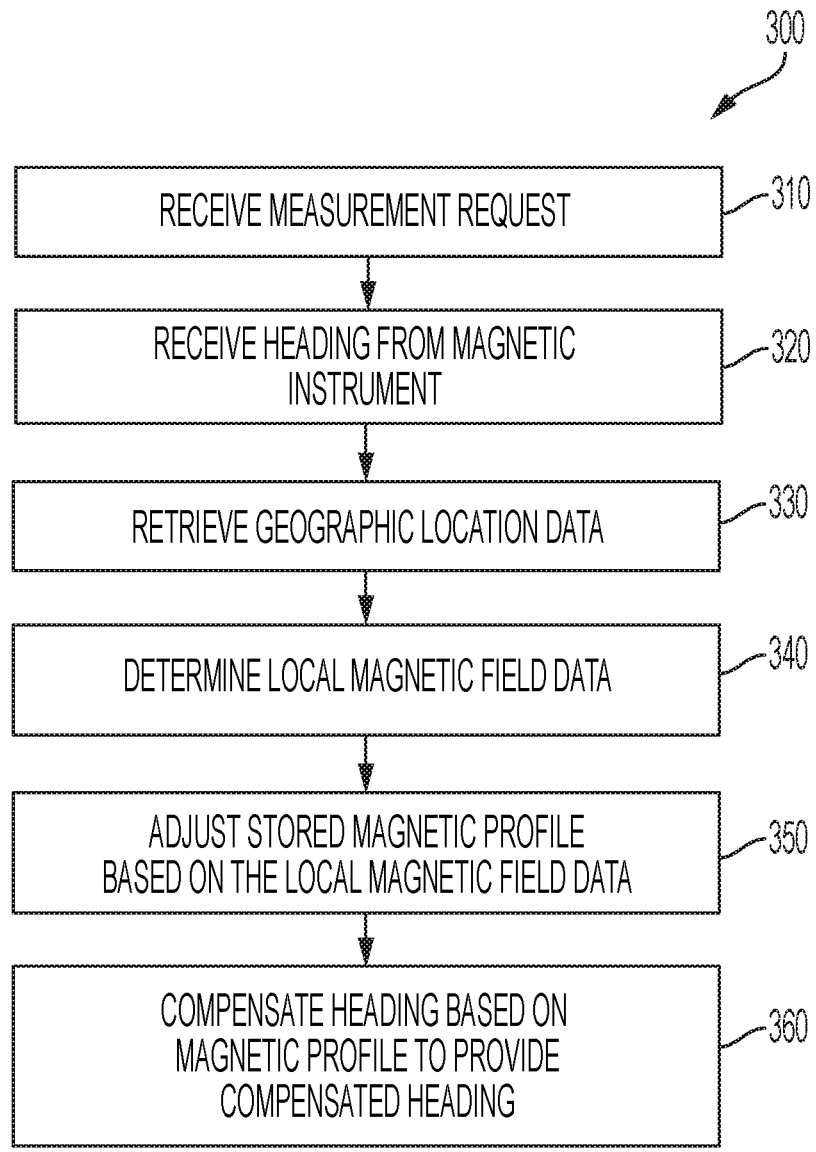
FIG. 3 is a flow chart illustrating a method to compensate a measurement from a magnetic instrument based on a magnetic profile, in accordance with exemplary embodiments of the disclosure.

For example, FIG. 3 is a flow chart of a method 300 to compensate a measurement from a magnetic instrument based on a magnetic error profile in accordance with embodiments of the present disclosure. The method 300 may be performed by a device, such as the apparatus 104 of FIG. 1.

The method 300 may include receiving a measurement request, at 310. The measurement request may be received from a processor or another system of the device, such as a system of the other instruments, electronics and/or navigation systems 130. The measurement request may be for a magnetic heading, in some examples. The method 300 may further include receiving a raw heading from a magnetic instrument, at 320. The raw measurement may include a magnetic heading. The magnetic instrument may include the magnetic instrument 110 of FIG. 1.

In some examples, the magnetic instrument may include a magnetic compass. The method 300 may further include retrieving geographic location data, at 330. The geographic location data may include latitude and longitude coordinates, in some examples. In some examples, the geographic location data may be received from a global positioning system (GPS) receiver, such as the geographic location receiver 160 of FIG. 1.

The method 300 may further include determining a local magnetic field data, at 340. The local magnetic field data may be retrieved based on the geographic location data. In some examples, the local magnetic field data may be retrieved from a world magnetic field database or table, such as the global magnetic field data 154 of FIG. 1. The magnetic field data may be stored as a directional strength or magnitude in each direction of an X, Y, Z coordinate system, or in polar or spherical coordinates.

For example, a Cartesian X, Y, Z coordinate system can be used for local magnetic field data describing a geomagnetic field with a vertical magnitude along a locally vertical Z axis, and horizontal magnitudes along X and Y axis oriented toward geographic north and east, respectively. Alternatively, a hybrid polar coordinate system can be used for local field data describing a vertical field magnitude along a locally vertical axis and a horizontal field magnitude along an azimuth direction defined about the vertical axis measuring from geographic north, or in spherical coordinates with a field magnitude and direction defined by zenith and azimuth angles measured with respect to the locally vertical axis. More generally the coordinate system varies, and the local field data can characterize the geomagnetic field in any suitable form, at any number of different geographic locations.

The method 300 may further include adjusting a stored magnetic error profile based on the local magnetic field data, at 350. The stored magnetic error profile may include magnetic error data for a specific location with particular local magnetic field data.

The magnetic error profile may be determined using the method 200 of FIG. 2. Adjusting the stored magnetic error profile may include adjusting a coefficient using ratios of at least one of X, Y, Z coordinate directional components of the local magnetic field as compared with the at least one of X, Y, Z coordinate directional components of the magnetic field of the specific location at which the magnetic error profile was determined. In some examples, the X, Y, Z coordinate directional component ratios used to provide the adjusted magnetic error profile include a ratio of the horizontal (e.g., X) coordinate directional components of the specific location versus the current location.

The method 300 may further include compensating the raw heading based on the adjusted magnetic error to provide a compensated magnetic heading (or compensated heading), at 360.

Figure 10A:
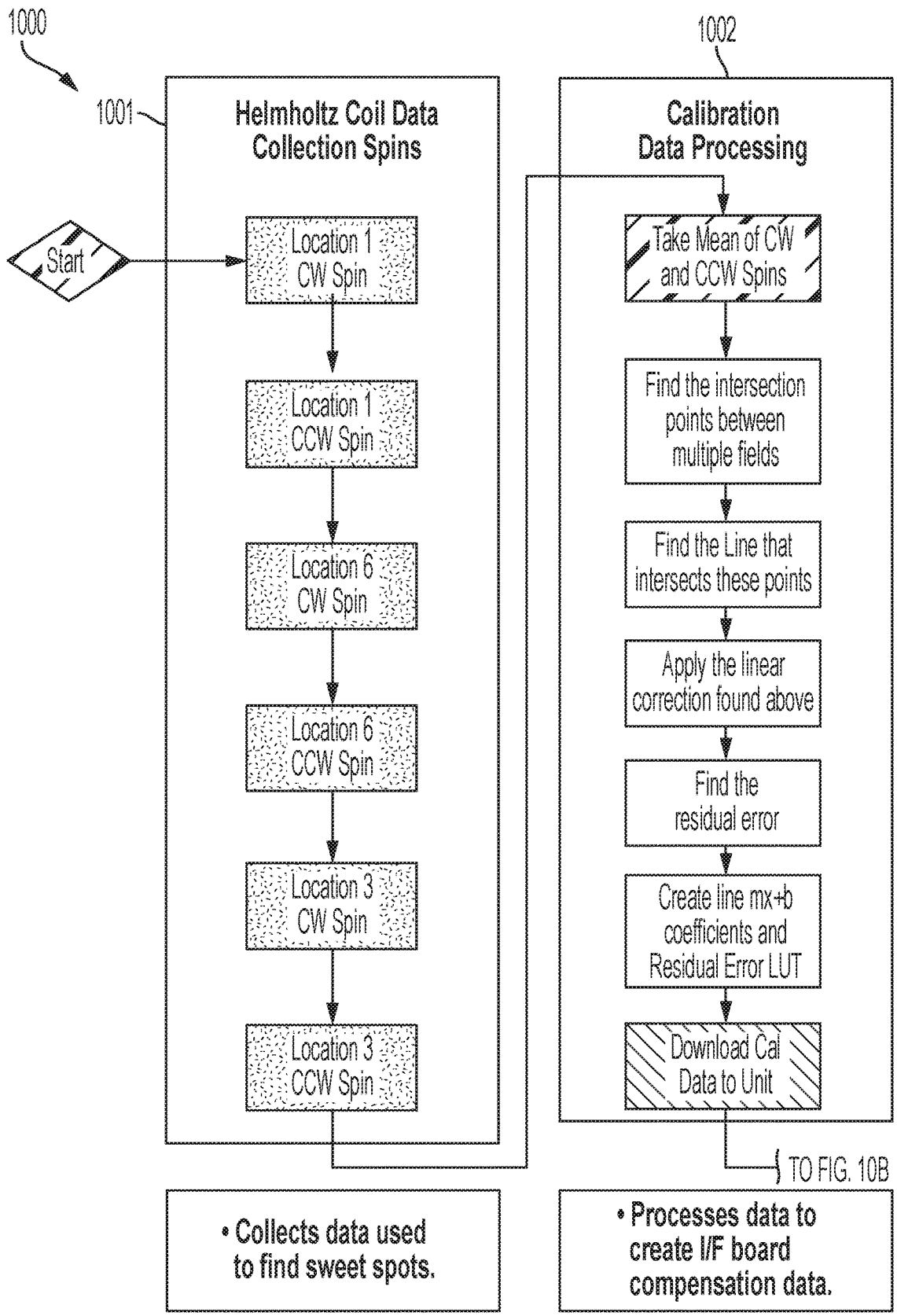
FIGS. 10A and 10B show a flow chart illustrating a representative method to determine the magnetic profile for a magnetic instrument in an apparatus, in accordance with exemplary embodiments of the disclosure.
Figure 10B:
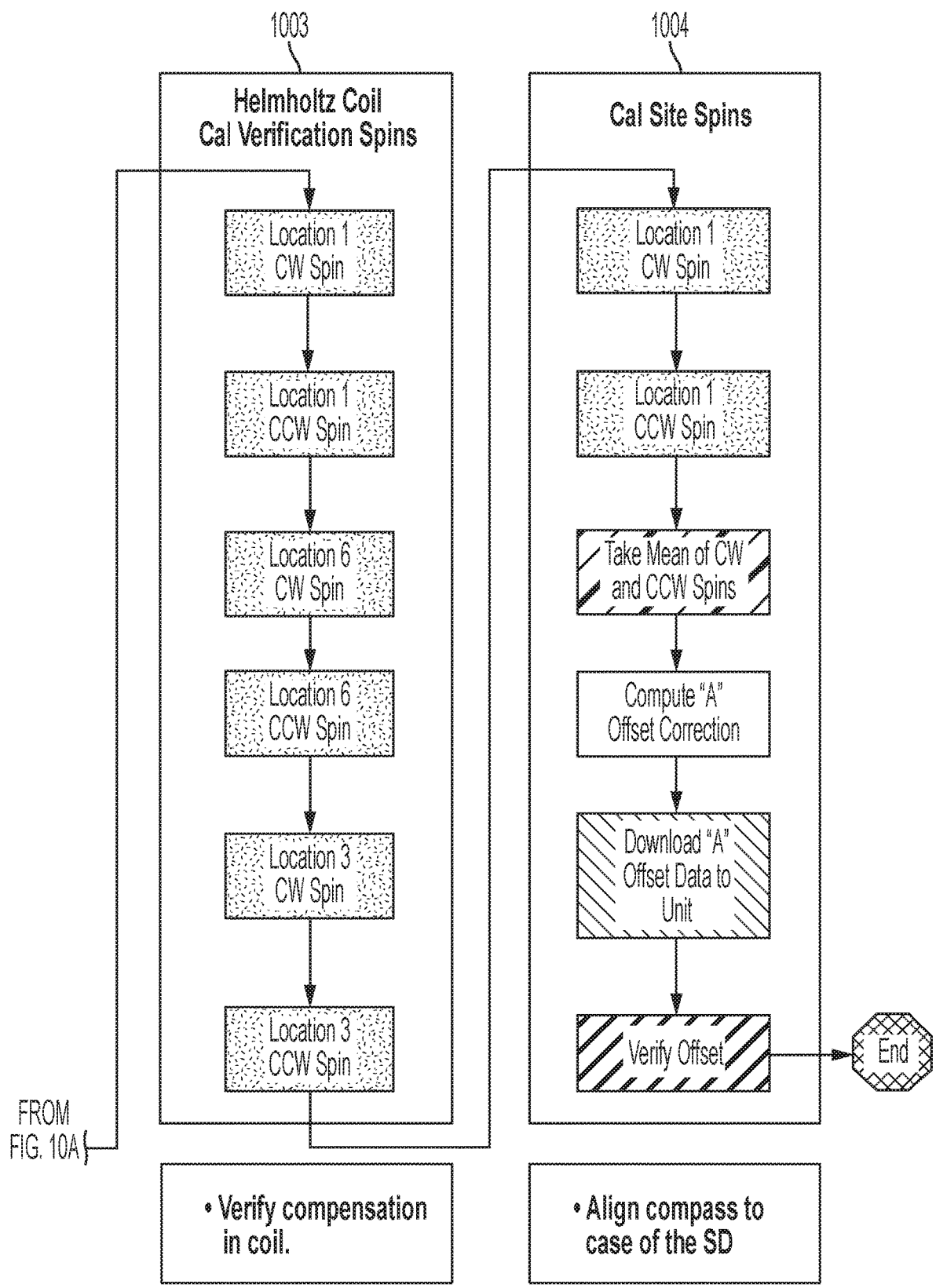

FIG. 10 is a flow chart illustrating a representative method 1000 to determine the magnetic profile of a magnetic instrument in an apparatus, in accordance with exemplary embodiments of the disclosure. The apparatus may include the device or apparatus 104 of FIG. 1, in some examples.

The method 1000 may be divided into four parts. A data collection portion 1001 of the method 1000 may include simulating magnetic fields for various geographic locations, and for each of the geographic locations spinning the device in the field clockwise and counter clockwise and collecting observed heading data from the un-compensated magnetic instrument.

A data processing portion 1002 of the method 1000 may include processing the data collection data to find intersecting points between the multiple fields, and generating calibration data for the device that includes mx+b line coefficients and a residual error. The calibration data may be downloaded to the device.

A calibration verification portion 1003 of the method 1000 may include repeating the data collection portion 1001 to simulate magnetic fields for the various geographic locations, and for each of the geographic locations spinning the device in the field clockwise and counter clockwise and collecting observed heading data using the calibrated magnetic instrument.

A calibration site test portion 1004 of the method 1000 may include repeating the data collection portion 1001 for the actual calibration location (e.g., outside of a test setup), including spinning the device in the field clockwise and counter clockwise and collecting observed heading data using the calibrated magnetic instrument. Based on the collected data, an offset correction may be determined and downloaded to the device. The offset data maybe based on the construction of the device in some examples.

In the particular example of FIG. 10, data collection (step 1001) includes defining several different "test" magnetic fields about the apparatus, for example where the local field is defied to simulate the geomagnetic field in a half dozen or more different geographical locations selected with a range of different representative local magnetic fields. The apparatus can be oriented in different azimuthal headings and with different pitch and roll orientations, in order to acquire a complete magnetic profile with profile data responsive to perturbations of the local field at each of the selected headings and orientations. Alternatively, the apparatus may remain stationary, and the field orientation can be rotated about the apparatus.

Data collection (step 1001) can also be performed to identify "sweet spots," where the observed magnetic heading is accurate to within a selected degree of accuracy in a wide range of different geomagnetic fields, over a particular range of headings. For example, the sweet spot may extend for a few degrees or more about a particular heading, where the perturbations due to the apparatus are minimized and the observed magnetic heading is accurate to within about a degree or less, or within a half degree or a few tenths of a degree or less, in a broad range of geographical locations worldwide. In each different configuration, the magnetic instrument is deployed with the apparatus in the same position it would have during operational deployment, and in the same operational configuration of the apparatus, in order to obtain an accurate representation of the local geomagnetic field perturbation due to the magnetic components on the apparatus.

Calibration and data processing (step 1002) can be performed to create stored compensation date in the magnetic profile; e.g., stored on a calibration interface (I/F) board or calibration module deployed on or with the apparatus. A number of different algorithms can be used to generate the profile (calibration) data, for example taking a mean of the clockwise and counterclockwise rotations, finding intersection points or crossing between heading (or heading errors) for multiple different representative local fields, and applying weights or scaling corrections, for example linear (slope/intercept), spline, polynomial extrapolation, residuals, or other fitting techniques, in order to scale the profile data acquired at a particular local field configuration to other observable fields, in different geographic locations. The calibration or profile data can then be stored in memory, for example by downloading to a calibration module or board to be deployed with the apparatus.

The field calibration also should be verified (step 1003). For example, a number of Helmholtz coils can be used to define a local field about the apparatus, where the field is perturbed proximate the magnetic instrument due to magnetic components of the apparatus. The apparatus can be spun or rotated through the full range of different heading and pitch and roll orientations (equivalently, the field can be rotated about the apparatus), in order to verify compensation in the coils.

For calibration (step 1004), the compass heading can be aligned according to a selected observable or calibration field. The apparatus (or equivalently an applied field) can be rotated through different azimuth headings and pitch or roll orientations, and suitable statistical methods such as taking the mean or average can be used to verify the offset, and compute corrections to the offset data. Alternatively the profile data can be corrected based on the offset data, for example by changing the scaling of the differences between the nominal and acquired headings, in order to improve response of the compensated heading to the (actual) directional or navigational heading of the apparatus when deployed.

Examples

A representative method for compensating a raw magnetic instrument measurement includes one or more of: receiving a heading measurement request, receiving a raw heading from a magnetic instrument, retrieving geographic location data, determining local magnetic field data based on the geographic location data, adjusting a stored magnetic error profile based on the local magnetic field data, and compensating the raw heading based on the adjusted magnetic error profile to provide a compensated magnetic heading. These steps can be performed in any order or combination.

In various examples and embodiments, adjusting the stored magnetic error profile may comprise adjusting a horizontal magnetic field coefficient of the stored magnetic error profile. Adjusting the horizontal magnetic field coefficient of the stored magnetic error profile can include one or both of determining a ratio of a horizontal magnetic field strength at a calibrated location to a horizontal magnetic field strength based on the local magnetic field data, and applying the ratio to the horizontal magnetic field coefficient.

In any of these examples and embodiments, retrieving geographic location data can include retrieving global positioning data from a global positioning system receiver. The magnetic instrument may include a magnetic compass system or apparatus, and the magnetic instrument can be installed in a subsea device or other apparatus as described herein, for example a submersible device, a surface vessel, a submarine or submersible craft, an autonomous or unmanned submersible vessel, or a diver propulsion vehicle.

An apparatus can include a subsea device according to any of the examples and embodiments herein. The apparatus may comprise any one or more of a magnetic instrument configured to provide a raw heading, and an instrument calibration module configured to receive the raw heading from the magnetic instrument. The instrument calibration module can be further configured to adjust the raw heading based on a magnetic error profile and magnetic field data associated with a current location of the apparatus, in order to provide a compensated magnetic heading. The magnetic error profile can be based on magnetic properties of the apparatus at a particular geographic location, for example to include perturbation of the local geomagnetic field by the apparatus, and as observed by the magnetic instrument deployed on the apparatus.

In any of these examples and embodiments, the instrument calibration module or another device deployed on the apparatus can be configured to retrieve geographic location data to determine the current location of the apparatus, and to retrieve the magnetic field data characterizing a local geomagnetic field, based on the current location. For example, a global positioning receiver can be configured to provide the geographic location data, and the local geomagnetic field data can be retrieved from memory or received via a wireless link.

In any of these examples and embodiments, memory can also be configured to store global magnetic field data, including the local geomagnetic field data representing the geomagnetic field at the current location of the apparatus, or a plurality of different locations. The memory can be further configured to store the magnetic profile; e.g., representing heading errors due to perturbation of the geomagnetic field by the device when deployed in a particular location.

In any of these examples and embodiments, the instrument calibration module can be configured to adjust a horizontal magnetic field coefficient of the magnetic error profile based on the magnetic field data associated with the current location of the apparatus. The instrument calibration module can also be configured to determine a ratio of a horizontal magnetic field strength (or magnitude) at the particular location to a horizontal magnetic field strength (or magnitude) based on the magnetic field data associated with the current location, and to apply the ratio to the horizontal magnetic field coefficient.

Another method for determining a magnetic error profile for a device includes any one or more of placing the magnetic device in a controlled test environment configured to simulate magnetic fields of one or more geographic locations, collecting magnetic error or magnetic profile data associated with one or more geographic locations, and determining the magnetic error profile or magnetic profile based on a comparison of the collected magnetic heading data and an expected or nominal magnetic heading data at the different geographic locations. These steps can be performed in any order or combination.

In any of these examples and embodiments, the method can further comprise one or more of collecting magnetic error data associated with a second geographic location, and adjusting the magnetic error profile based on the collected magnetic heading data from the second geographic location compared with expected magnetic heading data. Adjusting the stored magnetic error profile can comprise adjusting a horizontal magnetic field coefficient of the stored magnetic error profile.

In any of these examples and embodiments, the method can further comprise testing accuracy of the magnetic error profile by using the magnetic error profile based on new collected magnetic data. For example collecting the magnetic error data associated with the first geographic location can comprise spinning the device in at least one of a clockwise direction or a counter-clockwise direction to collect the magnetic heading data at different azimuths, tilting the device to provide a different pitch or roll orientation, or any combination of rotating the device, pitching the device, and rolling the device.

In any of these examples and embodiments, collecting the magnetic error data associated with the geographic locations can comprise spinning, rotating or turning the device in one or both of a clockwise direction and a counter-clockwise direction to collect the magnetic heading data. Memory can be provided for storing the magnetic error profile; e.g. on the device. For example, the device may be a subsea device or submersible according to any of the examples and embodiments herein. The controlled environment can include one or more Helmholtz coils configured to generate magnetic fields, for example to generate magnetic fields that simulate the local geomagnetic field at any number of different selected geographic locations.

Another method for compensating a magnetic heading includes obtaining a magnetic heading from a magnetic instrument deployed with an apparatus; determining location data for a geographic location of the apparatus; determining local field data based on the location data, wherein the local field data characterize a geomagnetic field proximate the geographic location; obtaining a magnetic profile for the magnetic instrument deployed with the apparatus, wherein the magnetic profile is responsive to perturbation of the geomagnetic field proximate the magnetic instrument, by the apparatus; and compensating the magnetic heading based the magnetic profile and the local magnetic field data, wherein the compensated heading is responsive to a directional heading of the apparatus in the geographic location.

In any of these examples and embodiments, the method can further comprise receiving a request for the compensated heading from an interface deployed with the apparatus, obtaining the magnetic profile by retrieving the profile from memory, and outputting the compensated heading to the interface.

In any of these examples and embodiments, the magnetic profile can characterize a difference between the magnetic heading obtained from the magnetic instrument and a nominal heading of the apparatus based on the geomagnetic field absent the perturbation, and further comprising scaling the difference based on the local magnetic field data, wherein the magnetic heading is compensated based on the scaled difference.

In any of these examples and embodiments, the magnetic profile can characterize a local magnetic field at which the magnetic profile was determined, and the method can further comprise determining a magnitude of the geomagnetic field at the geographic location of the apparatus, based on the local magnetic field data; determining a ratio between the magnitude of the geomagnetic field at the geographic location of the apparatus and a magnitude of the local magnetic field at which the magnetic profile was determined; and applying the ratio to scale the difference between the magnetic heading obtained from the magnetic instrument and the nominal heading of the apparatus.

In any of these examples and embodiments, the magnitude of the geomagnetic field can describe a horizontal component of the geomagnetic field at the geographic location of the apparatus and the magnitude of the local magnetic field describes a horizontal component of the local magnetic field at which the magnetic profile was determined.

In any of these examples and embodiments, the magnetic profile can characterize perturbation of the geomagnetic field by the apparatus in a plurality of different geographic locations, and the method can further comprise further: selecting one of the different geographic locations for compensating the magnetic heading based on the local field data, wherein the magnetic profile is responsive to perturbation of the geomagnetic field by the apparatus in the selected location; scaling the perturbation based on the local field data and the geomagnetic field in the selected location, wherein the scaled perturbation is responsive to perturbation of the geomagnetic field by the apparatus deployed in the geographic location; and compensating the magnetic heading based on the scaled perturbation, wherein the compensated heading is responsive to the directional heading of the apparatus.

In any of these examples and embodiments, the magnetic profile can characterize perturbation of the geomagnetic field by the apparatus in a plurality of different azimuth headings, and the method can further comprise: selecting one of the different azimuth headings for compensating the magnetic heading based on the local field data, wherein the magnetic profile is responsive to perturbation of the geomagnetic field by the apparatus in the selected heading; scaling the perturbation of the geomagnetic field based on the local field data; and compensating the magnetic heading based on the scaled perturbation, wherein the compensated heading is responsive to the directional heading of the apparatus.

In any of these examples and embodiments, the magnetic profile can characterize perturbation of the geomagnetic field by the apparatus in a plurality of different pitch and roll orientations, and the method can further comprise: selecting one of the different pitch and roll orientations to compensate the magnetic heading based on the local field data, wherein the magnetic profile is responsive to perturbation of the geomagnetic field by the apparatus in the selected orientation; scaling the perturbation of the geomagnetic field based on the local field data; and compensating the magnetic heading based on the scaled perturbation, wherein the compensated heading is responsive to the directional heading of the apparatus.

In any of these examples and embodiments, determining location data for the geographic location of the apparatus can comprise obtaining the location data from a global positioning system receiver deployed with the apparatus and updating the location data based on the compensated heading and a speed of the apparatus, absent operation of the global positioning receiver.

In any of these examples and embodiments, the apparatus can comprise a submersible device and the magnetic instrument comprises a magnetic compass or magnetometer deployed with the submersible device in a same operational configuration in which the magnetic profile was determined.

An apparatus can comprise: a magnetic instrument configured to acquire a magnetic heading responsive to a directional heading of the apparatus deployed in a geographic location; a location module comprising a receiver configured to obtain location data characterizing the geographic location; a compensation module in communication with the magnetic instrument and the location module, the compensation module comprising a processor configured to: determine local field data based on the location data, the local field data characterizing a geomagnetic field proximate the geographic location; retrieve a magnetic profile for the magnetic instrument from memory, the magnetic profile responsive to perturbation of the geomagnetic field proximate the magnetic instrument, by the apparatus; and compensate the heading acquired by the magnetic instrument, based on the magnetic profile and the local magnetic field data; and an interface in communication with the compensation module and configured to output the compensated heading, wherein the compensated heading is responsive to the directional heading of the apparatus deployed in the geographic location.

In any of these examples and embodiments, the memory can be configured to store local field data characterizing the geomagnetic field in a plurality of different geographic locations, and the magnetic profile can characterize perturbation of the geomagnetic field by the apparatus in each of the different geographic locations.

In any of these examples and embodiments, the compensation module can be further configured to: select one of the different geographic locations for compensating the magnetic heading; scale the perturbation based on the local field data and the geomagnetic field in the selected location; and compensate the magnetic heading based on the scaled perturbation, wherein the heading is compensated for perturbation of the geomagnetic field by the apparatus, proximate the geographic location to which the apparatus is deployed.

In any of these examples and embodiments, the magnetic profile can characterize a difference between the magnetic heading acquired by the magnetic instrument and a nominal heading of the apparatus based on the geomagnetic field proximate the geographic location, absent perturbation by the apparatus; and the compensation module can be configured to scale the difference between the acquired magnetic heading and the nominal heading based on the local magnetic field data; and the magnetic heading can be compensated based on the scaled difference, such that the compensated heading tracks the directional heading of the apparatus.

In any of these examples and embodiments, the compensation module can be configured to: determine a ratio between a magnitude of the geomagnetic field proximate the geographic location to which the apparatus is deployed and a magnitude of a local magnetic field at which the magnetic profile was determined; apply the ratio to scale the perturbation of the geomagnetic field by the apparatus; and compensate the magnetic heading based on the scaled perturbation, such that the magnetic heading is compensated for the perturbation of the geomagnetic field proximate the geographic location to which the apparatus is deployed.

In any of these examples and embodiments, the magnetic profile can characterize perturbation of the geomagnetic field by the apparatus in a plurality of different geographic locations; and the compensation module can be configured to: select one of the different locations for compensating the magnetic heading; and scale the perturbation for the geomagnetic field proximate the geographic location to which the apparatus is deployed, based on the geomagnetic field in the selected location; wherein the magnetic heading is compensated based on the scaled perturbation, responsive to perturbation of the geomagnetic field proximate the geographic location to which the apparatus is deployed.

In any of these examples and embodiments, the magnetic profile can characterize perturbation of the geomagnetic field by the apparatus in a plurality of different azimuth headings and the compensation module can be configured to select one of the different headings for compensating the magnetic heading acquired by the magnetic instrument, such that the compensated heading tracks the directional heading of the apparatus when deployed in the geographic location.

In any of these examples and embodiments, the magnetic profile can characterize perturbation of the geomagnetic field by the apparatus in a plurality of different pitch and roll orientations and the compensation module can be configured to select one of the different orientations to compensate the magnetic heading acquired by the magnetic instrument, such that the compensated heading tracks the directional heading of the apparatus when deployed in the geographic location.

In any of these examples and embodiments, the receiver can comprise a global positioning receiver configured to obtain the location data from a wireless signal and the apparatus can further comprise a navigational module configured to update the location data based on the compensated heading and a speed of the apparatus deployed in the geologic location, absent operation of the receiver.

In any of these examples and embodiments, the magnetic device can comprise a compass or magnetometer and the apparatus comprises submersible craft or submersible vessel, an autonomous or unmanned vessel, or a diver propulsion vehicle, and the magnetic instrument and apparatus can be deployed in a same operational configuration in which the magnetic profile was determined.

A method for calibrating a magnetic instrument deployed with an apparatus can comprise: deploying the magnetic instrument with an apparatus; defining a local magnetic field about the apparatus; acquiring magnetic headings with the magnetic instrument, wherein the magnetic headings are responsive to perturbation of the local magnetic field by the apparatus, proximate the magnetic instrument; defining nominal headings of the apparatus, absent the perturbation; and determining a magnetic profile for the magnetic instrument deployed with the apparatus based on the acquired magnetic headings, responsive to the perturbation of the local magnetic field; and storing the magnetic profile in memory, wherein the magnetic profile includes, local magnetic field data characterizing the local magnetic field and profile data characterizing differences between the nominal headings of the apparatus and the magnetic headings acquired by the magnetic instrument.

In any of these examples and embodiments, the method can further comprise: selecting a set of azimuth headings, wherein selecting the azimuth headings comprises clockwise rotation through the azimuth headings, counterclockwise rotation through the azimuth headings, or both; acquiring the magnetic headings with the magnetic instrument, wherein the magnetic headings are responsive to perturbation of the local magnetic field by the apparatus in each of the selected azimuth headings, proximate the magnetic instrument; defining the nominal headings for each of the selected azimuth headings, absent the perturbation; and storing azimuthal data in the magnetic profile, wherein the azimuthal data characterize differences between the nominal headings and the magnetic headings acquired by the magnetic instrument when deployed with the apparatus in each of the selected azimuth headings.

In any of these examples and embodiments, the method can further comprise: selecting a set of pitch and roll orientations, wherein the pitch and roll orientations comprise clockwise pitch or roll orientations, counterclockwise pitch or roll orientations, or any combination; acquiring the magnetic headings with the magnetic instrument, wherein the magnetic headings are responsive to perturbation of the local magnetic field by the apparatus in each of the selected pitch and roll orientations; defining the nominal headings for each of the selected pitch and roll orientations, absent the perturbation; and storing orientation data in the magnetic profile, wherein the orientation data characterize differences between the nominal headings and the magnetic headings acquired by the magnetic instrument when deployed with the apparatus in each of the selected pitch and roll orientations.

In any of these examples and embodiments, the method can further comprise: defining a plurality of different local magnetic fields representative of a plurality of different geomagnetic fields in a plurality of different geographic locations; acquiring the magnetic headings with the magnetic instrument deployed with the apparatus, wherein the magnetic headings are responsive to perturbation of each of the local fields by the apparatus proximate the magnetic instrument; storing the profile data in the magnetic profile, wherein the profile data characterize the differences between the nominal headings and the magnetic headings acquired by the magnetic instrument for each of the local magnetic fields; storing the local magnetic field data in the magnetic profile, wherein the local magnetic field data characterize the geomagnetic fields proximate each of the respective geographic locations; and storing location data in the magnetic profile, wherein the location data characterize each of the different geographic locations for each of the respective geomagnetic fields.

In any of these examples and embodiments, the method can further comprise: defining a calibration magnetic field; determining a ratio between a magnitude of the calibration magnetic field and a magnitude of the local magnetic field, wherein the magnitudes describes horizontal or vertical components of the respective magnetic fields, or both; scaling the differences between the nominal headings and the magnetic headings acquired by the magnetic instrument by the ratio; and storing the scaled differences in the magnetic profile, wherein the scaled differences characterize perturbation of the calibration magnetic field by the apparatus, as observable by the magnetic instrument when deployed therewith.

In any of these examples and embodiments, the method can further comprise: defining the calibration magnetic field about the apparatus; acquiring magnetic headings with the magnetic instrument deployed with the apparatus, wherein the magnetic headings are responsive to perturbation of the calibration magnetic field proximate the magnetic instrument; storing offset data in the magnetic profile, wherein the offset data characterize offsets between the nominal headings and the magnetic headings acquired by the magnetic instrument responsive to perturbation of the calibration magnetic field by the apparatus; comparing the scaled differences in the profile data to the offset data; and updating the magnetic profile, wherein the profile data are updated to correct the offset data or the profile data or both, based on variations between the scaled differences and the offset data.

In any of these examples and embodiments, the method can further comprise: deploying the apparatus in a selected geographic location; acquiring a magnetic heading with the magnetic instrument, wherein the magnetic instrument and apparatus are deployed in a same operational configuration in which the magnetic profile was determined; and compensating the magnetic heading based on the magnetic profile, wherein the compensated magnetic heading tracks a directional heading of the apparatus deployed in the geographic location.

While this disclosure is directed to representative embodiments, other examples may be encompassed without departing from the scope of invention, as determined by the claims. While the invention may be described with respect to particular exemplary embodiments, it is understood that changes can be made and equivalents may be substituted to adapt the disclosure to different problems and application, while remaining within the spirit and scope of the invention as claimed. The invention is not limited to the particular examples that are described, but encompasses all embodiments falling within the scope of the claims.

The invention claimed is:

1. A method for compensating a magnetic heading, the method comprising:
obtaining a magnetic heading from a magnetic instrument deployed with an apparatus;
determining location data for a geographic location of the apparatus;

determining local field data based on the location data, wherein the local field data characterize a geomagnetic field proximate the geographic location;

obtaining a magnetic profile for the magnetic instrument deployed with the apparatus, wherein the magnetic profile is responsive to perturbation of the geomagnetic field proximate the magnetic instrument, by the apparatus, wherein the magnetic profile characterizes perturbation of the geomagnetic field by the apparatus in a plurality of different geographic locations;

selecting one of the different geographic locations for compensating the magnetic heading based on the local field data, wherein the magnetic profile is responsive to perturbation of the geomagnetic field by the apparatus in the selected location;

scaling the perturbation based on the local field data and the geomagnetic field in the selected location, wherein the scaled perturbation is responsive to perturbation of the geomagnetic field by the apparatus deployed in the geographic location; and compensating the magnetic heading based on the scaled perturbation, wherein the compensated heading is responsive to the directional heading of the apparatus.

2. The method of claim 1, further comprising receiving a request for the compensated heading from an interface deployed with the apparatus, obtaining the magnetic profile by retrieving the profile from memory, and outputting the compensated heading to the interface.

3. The method of claim 1, wherein the magnetic profile characterizes a difference between the magnetic heading obtained from the magnetic instrument and a nominal heading of the apparatus based on the geomagnetic field absent the perturbation, and further comprising scaling the difference based on the local magnetic field data, wherein the magnetic heading is compensated based on the scaled difference.

4. The method of claim 3, wherein the magnetic profile characterizes a local magnetic field at which the magnetic profile was determined, and further comprising:

determining a magnitude of the geomagnetic field at the geographic location of the apparatus, based on the local magnetic field data;

determining a ratio between the magnitude of the geomagnetic field at the geographic location of the apparatus and a magnitude of the local magnetic field at which the magnetic profile was determined; and applying the ratio to scale the difference between the magnetic heading obtained from the magnetic instrument and the nominal heading of the apparatus.

5. The method of claim 4, wherein the magnitude of the geomagnetic field describes a horizontal component of the geomagnetic field at the geographic location of the apparatus and the magnitude of the local magnetic field describes a horizontal component of the local magnetic field at which the magnetic profile was determined.

6. The method of claim 1, wherein the magnetic profile characterizes perturbation of the geomagnetic field by the apparatus in a plurality of different azimuth headings, and further:

selecting one of the different azimuth headings for compensating the magnetic heading based on the local field data, wherein the magnetic profile is responsive to perturbation of the geomagnetic field by the apparatus in the selected heading;

scaling the perturbation of the geomagnetic field based on the local field data; and compensating the magnetic heading based on the scaled perturbation, wherein the compensated heading is responsive to the directional heading of the apparatus.

7. The method of claim 1, wherein the magnetic profile characterizes perturbation of the geomagnetic field by the apparatus in a plurality of different pitch and roll orientations, and further:

selecting one of the different pitch and roll orientations to compensate the magnetic heading based on the local field data, wherein the magnetic profile is responsive to perturbation of the geomagnetic field by the apparatus in the selected orientation;

scaling the perturbation of the geomagnetic field based on the local field data; and compensating the magnetic heading based on the scaled perturbation, wherein the compensated heading is responsive to the directional heading of the apparatus.

8. The method of claim 1, wherein determining location data for the geographic location of the apparatus comprises obtaining the location data from a global positioning system receiver deployed with the apparatus and updating the location data based on the compensated heading and a speed of the apparatus, absent operation of the global positioning receiver.

9. The method of claim 1, wherein the apparatus comprises a submersible device and the magnetic instrument comprises a magnetic compass or magnetometer deployed with the submersible device in a same operational configuration in which the magnetic profile was determined.

10. An apparatus comprising:

a magnetic instrument configured to acquire a magnetic heading responsive to a directional heading of the apparatus deployed in a geographic location;

a location module comprising a receiver configured to obtain location data characterizing the geographic location;

a compensation module in communication with the magnetic instrument and the location module, the compensation module comprising a processor configured to:

determine local field data based on the location data, the local field data characterizing a geomagnetic field proximate the geographic location;

retrieve a magnetic profile for the magnetic instrument from memory, the magnetic profile responsive to perturbation of the geomagnetic field proximate the magnetic instrument, by the apparatus, wherein the magnetic profile characterizes perturbation of the geomagnetic field by the apparatus in a plurality of different geographic locations;

select one of the different locations for compensating the magnetic heading;

scale the perturbation for the geomagnetic field proximate the geographic location to which the apparatus is deployed, based on the geomagnetic field in the selected location; and compensate the heading acquired by the magnetic instrument, based on the local field data and the scaled perturbation, responsive to perturbation of the geomagnetic field proximate the geographic location to which the apparatus is deployed; and an interface in communication with the compensation module and configured to output the compensated heading, wherein the compensated heading is responsive to the directional heading of the apparatus deployed in the geographic location.

11. The apparatus of claim 10, wherein the memory is configured to store local field data characterizing the geomagnetic field in a plurality of different geographic locations, and wherein the magnetic profile characterizes perturbation of the geomagnetic field by the apparatus in each of the different geographic locations.

12. The apparatus of claim 11, wherein the compensation module is further configured to:
   select one of the different geographic locations for compensating the magnetic heading;
   scale the perturbation based on the local field data and the geomagnetic field in the selected location; and
   compensate the magnetic heading based on the scaled perturbation, wherein the heading is compensated for perturbation of the geomagnetic field by the apparatus, proximate the geographic location to which the apparatus is deployed.

13. The apparatus of claim 10, wherein the magnetic profile characterizes a difference between the magnetic heading acquired by the magnetic instrument and a nominal heading of the apparatus based on the geomagnetic field proximate the geographic location, absent perturbation by the apparatus; and
   wherein the compensation module is configured to scale the difference between the acquired magnetic heading and the nominal heading based on the local magnetic field data; and
   wherein the magnetic heading is compensated based on the scaled difference, such that the compensated heading tracks the directional heading of the apparatus.

14. The apparatus of claim 10, wherein the compensation module is configured to:
   determine a ratio between a magnitude of the geomagnetic field proximate the geographic location to which the apparatus is deployed and a magnitude of a local magnetic field at which the magnetic profile was determined;
   apply the ratio to scale the perturbation of the geomagnetic field by the apparatus; and
   compensate the magnetic heading based on the scaled perturbation, such that the magnetic heading is compensated for the perturbation of the geomagnetic field proximate the geographic location to which the apparatus is deployed.

15. The apparatus of claim 10, wherein the magnetic profile characterizes perturbation of the geomagnetic field by the apparatus in a plurality of different azimuth headings and the compensation module is configured to select one of the different headings for compensating the magnetic heading acquired by the magnetic instrument, such that the compensated heading tracks the directional heading of the apparatus when deployed in the geographic location.

16. The apparatus of claim 10, wherein the magnetic profile characterizes perturbation of the geomagnetic field by the apparatus in a plurality of different pitch and roll orientations and the compensation module is configured to select one of the different orientations to compensate the magnetic heading acquired by the magnetic instrument, such that the compensated heading tracks the directional heading of the apparatus when deployed in the geographic location.

17. The apparatus of claim 10, wherein the receiver comprises a global positioning receiver configured to obtain the location data from a wireless signal and further comprising a navigational module configured to update the location data based on the compensated heading and a speed of the apparatus deployed in the geologic location, absent operation of the receiver.

18. The apparatus of claim 10, wherein the magnetic device comprises a compass or magnetometer and the apparatus comprises submersible craft or submersible vessel, an autonomous or unmanned vessel, or a diver propulsion vehicle, and wherein the magnetic instrument and apparatus are deployed in a same operational configuration in which the magnetic profile was determined.

19. A method for calibrating a magnetic instrument deployed with an apparatus, the method comprising:
   deploying the magnetic instrument with the apparatus;
   simulating, using a test setup, a local magnetic field about the apparatus;
   acquiring magnetic headings with the magnetic instrument, wherein the magnetic headings are responsive to perturbation of the local magnetic field by the apparatus, proximate the magnetic instrument;
   defining nominal headings of the apparatus, absent the perturbation; and
   determining a magnetic profile for the magnetic instrument deployed with the apparatus based on the acquired magnetic headings, responsive to the perturbation of the local magnetic field; and
   storing the magnetic profile in memory, wherein the magnetic profile includes local magnetic field data characterizing the local magnetic field and profile data characterizing differences between the nominal headings of the apparatus and the magnetic headings acquired by the magnetic instrument.

20. The method of claim 19, further comprising:
   selecting a set of azimuth headings, wherein selecting the azimuth headings comprises clockwise rotation through the azimuth headings, counterclockwise rotation through the azimuth headings, or both;
   acquiring the magnetic headings with the magnetic instrument, wherein the magnetic headings are responsive to perturbation of the local magnetic field by the apparatus in each of the selected azimuth headings, proximate the magnetic instrument;
   defining the nominal headings for each of the selected azimuth headings, absent the perturbation; and
   storing azimuthal data in the magnetic profile, wherein the azimuthal data characterize differences between the nominal headings and the magnetic headings acquired by the magnetic instrument when deployed with the apparatus in each of the selected azimuth headings.

21. The method of claim 19, further comprising:
   selecting a set of pitch and roll orientations, wherein the pitch and roll orientations comprise clockwise pitch or roll orientations, counterclockwise pitch or roll orientations, or any combination;
   acquiring the magnetic headings with the magnetic instrument, wherein the magnetic headings are responsive to perturbation of the local magnetic field by the apparatus in each of the selected pitch and roll orientations;
   defining the nominal headings for each of the selected pitch and roll orientations, absent the perturbation; and
   storing orientation data in the magnetic profile, wherein the orientation data characterize differences between the nominal headings and the magnetic headings acquired by the magnetic instrument when deployed with the apparatus in each of the selected pitch and roll orientations.

22. The method of claim 19, further comprising:
   defining a plurality of different local magnetic fields representative of a plurality of different geomagnetic fields in a plurality of different geographic locations;
   acquiring the magnetic headings with the magnetic instrument deployed with the apparatus, wherein the magnetic headings are responsive to perturbation of each of the local fields by the apparatus proximate the magnetic instrument;

storing the profile data in the magnetic profile, wherein the profile data characterize the differences between the nominal headings and the magnetic headings acquired by the magnetic instrument for each of the local magnetic fields;

storing the local magnetic field data in the magnetic profile, wherein the local magnetic field data characterize the geomagnetic fields proximate each of the respective geographic locations; and storing location data in the magnetic profile, wherein the location data characterize each of the different geographic locations for each of the respective geomagnetic fields.

23. The method of claim 19, further comprising:
defining a calibration magnetic field;
determining a ratio between a magnitude of the calibration magnetic field and a magnitude of the local magnetic field, wherein the magnitudes describes horizontal or vertical components of the respective magnetic fields, or both;
scaling the differences between the nominal headings and the magnetic headings acquired by the magnetic instrument by the ratio; and
storing the scaled differences in the magnetic profile, wherein the scaled differences characterize perturbation of the calibration magnetic field by the apparatus, as observable by the magnetic instrument when deployed therewith.

24. The method of claim 23, further comprising:
defining the calibration magnetic field about the apparatus;
acquiring magnetic headings with the magnetic instrument deployed with the apparatus, wherein the magnetic headings are responsive to perturbation of the calibration magnetic field proximate the magnetic instrument;
storing offset data in the magnetic profile, wherein the offset data characterize offsets between the nominal headings and the magnetic headings acquired by the magnetic instrument responsive to perturbation of the calibration magnetic field by the apparatus;
comparing the scaled differences in the profile data to the offset data; and
updating the magnetic profile, wherein the profile data are updated to correct the offset data or the profile data or both, based on variations between the scaled differences and the offset data.

25. The method of claim 24, further comprising:
deploying the apparatus in a selected geographic location;
acquiring a magnetic heading with the magnetic instrument, wherein the magnetic instrument and apparatus are deployed in a same operational configuration in which the magnetic profile was determined; and
compensating the magnetic heading based on the magnetic profile, wherein the compensated magnetic heading tracks a directional heading of the apparatus deployed in the geographic location.

* * * * *